(12) United States Patent  (10) Patent No.: US 6,517,334 B1
Neuschwander  (45) Date of Patent: Feb. 11, 2003

(54) MOLDING TOOL FOR PRODUCING A PLURALITY OF ASSEMBLED INJECTION MOLDED COMPONENTS

(75) Inventor: Helmut Neuschwander, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/556,979

(22) Filed: Apr. 24, 2000

(30) Foreign Application Priority Data

Apr. 24, 1999 (DE) .......................... 199 18 776

(51) Int. Cl.⁷ .............................. B29C 45/16
(52) U.S. Cl. ................ 425/116; 264/251; 264/254; 264/255; 425/127; 425/130; 425/572
(58) Field of Search ................. 425/130, 572, 425/588, 116, 127, 129.1, 576; 264/251, 254, 255

(56) References Cited

U.S. PATENT DOCUMENTS 5,756,013 A * 5/1998 Yanagihara et al. ........ 264/255
5,817,345 A * 10/1998 Koch et al. .................. 425/572

* cited by examiner

*Primary Examiner*—Tim Heitbrink
(74) *Attorney, Agent, or Firm*—Crowell & Moring LLP

(57) ABSTRACT

A molding tool for producing several assembly injection molded components, especially assembly injection molded switching dampers, which are combined into a subassembly by inserting an insertion part, and a method for producing such a subassembly from several components using the molding tool of the invention. The insertion part is encapsulated at least partially by one or more of the components to be injection molded, as a result of which a completely assembled subassembly is produced in the original molding process. This can be, for example, a switching damper assembly 18, which results from a common actuating shaft 17. In this way, assembly injection molded components 14, 15 with a complicated structure can be produced, for which a molding tool with only a single molding cavity would not be usable. The individual components 13 are produced in different mold cavities, which preferably are mounted rotatably on a carousel. By rotating the mold cavities, their accessibility to handling tools, which are needed for the production steps, can be determined flexibly.

7 Claims, 1 Drawing Sheet

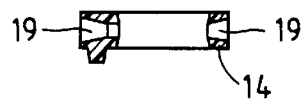
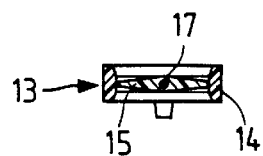
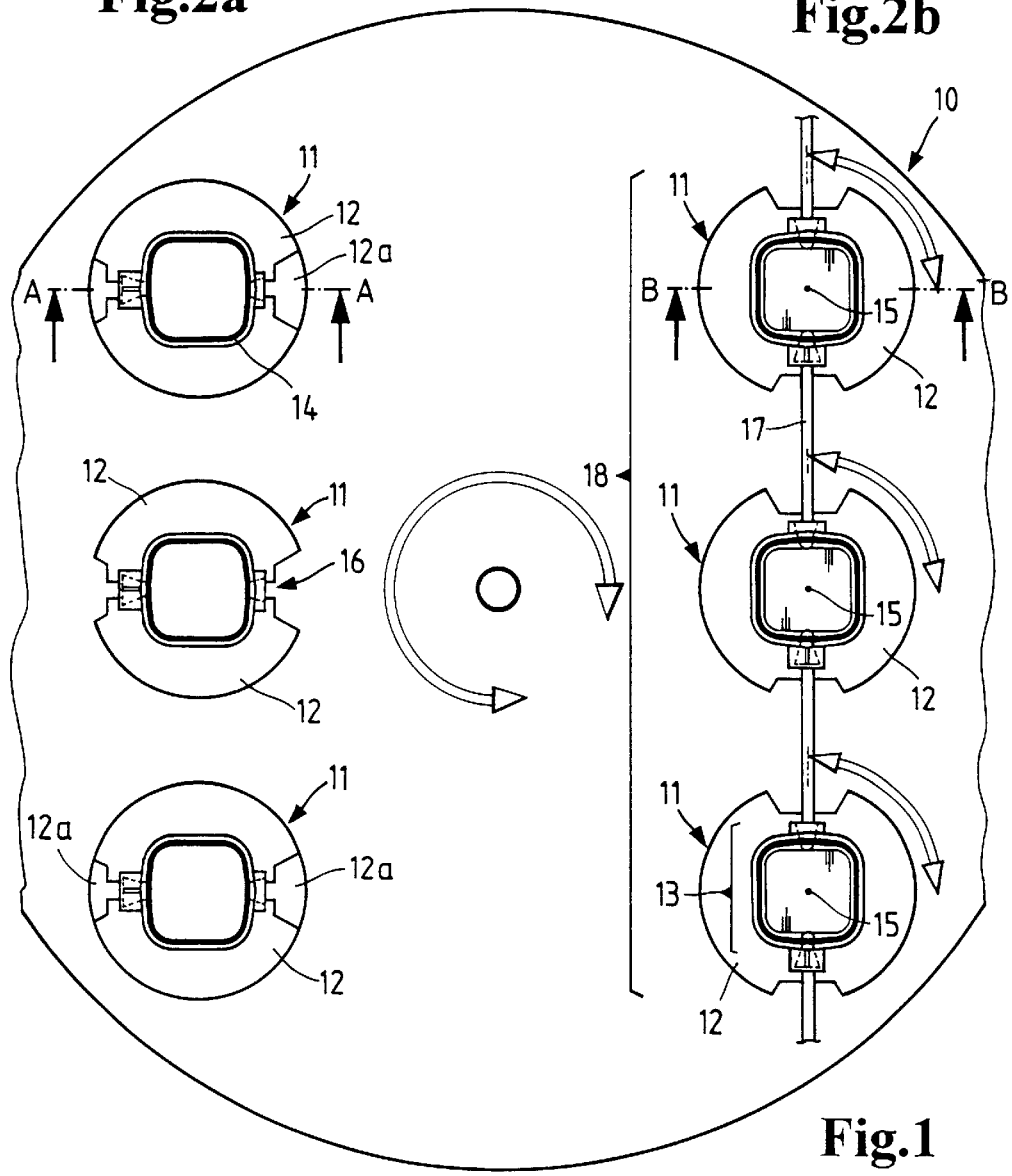
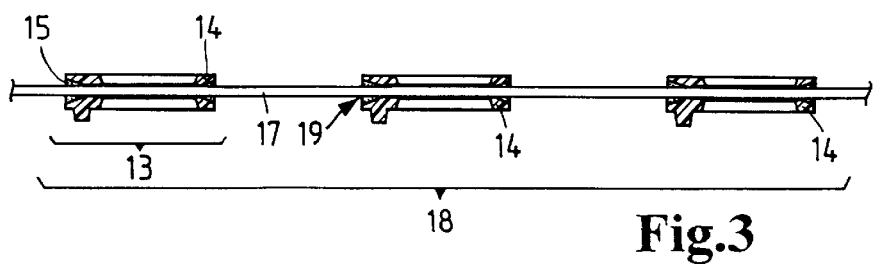

MOLDING TOOL FOR PRODUCING A PLURALITY OF ASSEMBLED INJECTION MOLDED COMPONENTS

BACKGROUND OF THE INVENTION

The invention relates to a molding tool for producing a plurality of assembled, injection molded components with several mold cavities, and to a method for simultaneously producing a plurality of assembled injection molded components with a single molding tool.

The production of assembled injection molded components is known and described, for example, in German patent no. DE 33 40 122, column 2, starting at line 15. By appropriately configuring the individual mold parts of the mold tool, different mold geometries can be produced, which permit the stepwise injection molding of individual parts of the component, which are to be produced by assembly injection molding. The previously produced parts always form a part of the new geometry of the mold. The individual parts of the assembly injection molded components are connected with one another in this way. By appropriate choice of materials, especially synthetic resins, it is also possible to extrude parts, which do not adhere to one another, i.e., parts which are movable relative to each other. However, materials, which adhere to one another, can also be used, for example for producing sealing edges.

European patent no. EP 482 272 B1 discloses a method for producing assembly injection molded switching dampers. For this purpose the switching damper and the shaft of the switching damper are assembly injection molded in one piece in the associated damper frame (see figure 5). For producing the damper frame, core inserts 3, 4, must be provided in the mold for the switching damper and fill up the volume of the damper shaft. For producing the switching damper shaft component, these core inserts must be removed from the injection mold. For this purpose, a handling space for the core inserts 3, 4 must be provided around the mold.

European patent no. EP 747 587 A1 teaches providing the assembly injection molded components with additional insertion parts, which are placed in the injection mold (see figure 4, component 22). These insertion parts can improve the functional properties of the assembly injection molded, cast parts, such as ensuring the satisfactory mounting of movable parts and compensating for shrinkage process of the injection molded parts.

However, the complexity of the assembly injection molded components is limited since the geometries which can be realized with the molded parts of the molding tool, must be taken into consideration in their design. If a component becomes too complex to be produced in one molding tool, several mold cavities, which have different geometries, can also be provided in the molding tool. However, this means a higher handling expenditure, as a result of which the advantages of the assembly injection molding are partially cancelled. In addition, cutbacks must be made in the tolerances of the component that is to be manufactured.

A different possibility is to assemble several assembly injection molded components of lesser complexity into one subassembly, which fulfills the complexity requirements. However, this would represent only a partial transformation of the idea associated with assembly injection molding of saving assembly costs by producing finished parts from the very start. With that, the economic efficiency of such subassemblies would once again be limited.

SUMMARY OF THE INVENTION

It is therefore an object of the invention to provide a molding tool with which it is possible to produce complex assembly injection molded component structures.

A further object of the invention is to provide a molding method which makes use of the apparatus of the invention.

These and other objects of the invention are achieved by the invention as described and claimed hereinafter.

Pursuant to the invention, a molding tool is proposed, which has several mold cavities for producing assembly injection molded components. This tool is characterized by the fact that in order to realize at least one mold geometry defined by mold cavities, seats are created, into which an insertion part can be inserted which connects the components to be produced. In a subsequent step of the assembly injection molding process, this insertion part is encapsulated. As a result, a fixed assembly of assembly injection molded components results. This assembly comes out of the molding tool as a unit and can be used without costs for assembling the individual components. The economic efficiency of the assembly injection molded assembly is increased by these means. At the same time, the assembly can have a complex structure, which could not be achieved if a mold cavity were used in the molding tool.

In this regard, it is immaterial whether the assembly injection molded parts of the components can be moved relative to one another (for example, a switching element) or whether they are firmly connected to one another (for example, a gated seal). The seat for the insertion part can be formed from various mold parts of the mold cavities or also by component parts already assembly injection molded. The previously molded component parts and the mold parts can together produce the mold geometry necessary for producing new component parts.

In accordance with one preferred embodiment of the invention, the seats for the insertion parts are constructed in such a manner that they lie on a common axis. The insertion part can then be inserted into the seats along this axis. In accordance with a preferred variant of this embodiment, the insertion part may consist of a rod-shaped part. This may be, for example, an actuating shaft for switching parts of the individual components. The seats then comprise holes into which the rod-shaped insertion part is pushed. This has the advantage that the seats can be produced by removing simple pin-shaped mold parts in the appropriate manufacturing step of the assembly injection molding process.

A far higher flexibility in the geometric arrangement of the component assemblage can be achieved if the individual mold cavities are disposed rotatably in the molding tool. This has the advantage that, before the insertion part is introduced, the mold cavities can be brought into the respectively most advantageous position corresponding to an advantageous accessibility for feeding in the injection molding material as well as for the relative movement, which is to be produced between the molded parts.

In one advantageous embodiment of the inventive molding tool, several subassemblies can be produced simultaneously. The molding tool may, for example, be constructed in carousel fashion, in which case the mold cavities belonging to a subassembly, rotate below the handling machines of the respective manufacturing steps. In this way, a clocked production course can be produced, the handling machines of all manufacturing steps being used in each cycle. The result is an optimum utilization of the manufacturing potential of the equipment as a whole.

In a particularly preferred embodiment of the invention, the molding tool has molding cavities for producing assembly injection molded switching dampers. These can be designed, for example, as proposed in the EP 482 272 B1. A shaft, connecting the switching dampers, is then used as insertion part and is suitable for actuating all switching dampers simultaneously. The seats for the shaft are formed by core inserts, which are inserted laterally into the mold cavities and must be removed before casting in the shaft. For this purpose, a certain free handling space for the core inserts is necessary in the axial direction relative to the shaft. In the event that this is not available because of the distance that is required between the switching dampers, rotatable mold cavities can be used. It is then possible to manufacture the damper frame in one position of the mold cavities, in which the holes in the damper frames are aligned at an angle of 90° to the common damper shaft. In this position, the pin-shaped mold parts can be removed from the associated seats without great effort and, because of the identical lifting-out motion at all mold cavities, the pin removal can even be effected with a single handling device. Subsequently, the mold cavities can be rotated by 90°, so that the shaft can be introduced into the seats of the individual switching dampers.

The insertion part may, for example, comprise a steel shaft. This is inserted into the openings provided for this purpose in the damper frames, the latter having largely cooled down already. A possible component shrinkage has therefore already taken place, and the dimensions of the shaft can be selected so that the bearing clearance is small. The subsequent encapsulation of the shaft within the switching dampers ensures a torsionally rigid connection, so that the shaft can be used to actuate the switching dampers.

A method for producing the component assemblies using the molding tool of the invention comprises simultaneously producing a plurality of assembly injection molded components with a single molding tool in which a plurality of mold cavities are provided for producing said plurality of assembled injection molded components, each mold cavity comprising mold parts for forming a respective mold geometry associated with a different production state of the components, and wherein the mold geometry of at least one mold cavity forms a seat for an insertion part which connects the components into a subassembly. The method includes the steps of assembling the mold parts to form a mold cavity; injecting a filler material into the mold cavity to form a component part; allowing the filler material to at least partially solidify; and switching mold parts to form a further mold cavity and repeating the assembling, injecting and solidifying steps at least once to form at least one further component part; wherein, prior to forming at least one of the component parts, an insertion part is inserted into the seats of the mold cavities so that at least two of the component parts are connected to one another molding them around the insertion part.

In a preferred variant of the method the mold cavities are mounted rotatably on the molding tool; the seats comprise holes into which a rod-shaped insertion part can be pushed; at least one component part is injection molded per mold cavity; and the method includes removing the mold parts which close the seat holes; rotating the mold cavities until the seat holes lie on a common axis, pushing the rod-shaped insertion part along the common axis into the seat holes, and encapsulating the insertion part in a further injection molded component part.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail with reference to an illustrative preferred embodiment depicted in the accompanying drawings in which:

FIG. 1 shows a plan view of a molding tool with opened mold cavities for producing switching damper assemblies;

FIG. 2a shows sectional view of the damper frame of the produced switching dampers taken along line A—A of FIG. 1;

FIG. 2b shows a sectional view through a switching damper of the switching damper assembly taken along the line B—B of FIG. 1, and FIG. 3 shows a longitudinal section through the switching damper assembly along the actuation shaft.

DESCRIPTION OF PREFERRED EMBODIMENTS

In FIG. 1, a molding tool, constructed as a carousel, is shown in plan view. This carousel has mold cavities 11, which consist of individual mold parts 12, 12a. Each mold cavity is responsible for producing a component 13 by casting. In the example embodiment, the components each comprise a damper frame 14 and a switching damper 15. In the mold cavities 15, furthermore, seats 16 are provided, which are closed off by the mold parts 12a. This can be seen in the upper and the lower mold cavity of the left row of FIG. 1. The mold cavities are shown without the respective upper mold parts, so that the damper frames 14, produced in the first manufacturing step can be recognized.

In the central mold cavity of the left row, the diagrammatically shown mold parts 12a have already been removed, and the seat 16 is freed for a shaft-like insertion part 17 which, after the mold cavities are rotated through 90° and the carousel is rotated through 180° (indicated by double arrows), is pushed into the mold cavities. In this way, a subassembly 18 is formed. The components 13 are permanently connected to form the subassembly 18 by encasing the insertion part 17 within the switching dampers 15.

In FIG. 2a, the damper frame 14, as produced in the first production step, is shown in section. It is constructed in one piece and has bearings 19 for the shaft-like insertion part, which simultaneously form part of the seat 16 (see FIG. 1) for the insertion part. If these are selected larger in diameter than in the manner shown, they do not serve as seat 16 but produce a cavity between the insert part 17 and the damper frame. This cavity is also filled by the switching damper material when the switching damper is produced in the second production step. This may have bearing advantages.

In FIG. 2b, the completed injection molded component 13 is shown. It is comprised of the switching damper 15 and the damper frame 14. Furthermore, the insertion part 17 also can be seen.

The finished subassembly 18 is shown in FIG. 3. In the illustrative embodiment, it is comprised of three assembly injection molded components 13, which form a switching damper assembly. The bearings 19 can also be seen. Here, the damper is partly connected directly to the insertion part 17, and partly through a conical molded-on continuation of the switching damper 15.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A molding tool for producing a plurality of assembled, injection molded components, wherein a mold cavity is provided for each of the molded components, each mold cavity comprising mold parts for forming a respective mold geometry associated with a different production state of the components, and wherein the mold geometry of at least one mold cavity forms a seat for an insertion part which connects the components into a subassembly.

2. A molding tool for producing a plurality of assembled, injection molded components, wherein a mold cavity is provided for each of the molded components, each mold cavity comprising mold parts for forming a respective mold geometry associated with a different production state of the components, wherein the mold geometry of at least one mold cavity forms a seat for an insertion part which connects the components into a subassembly, and wherein a plurality of seats for the insertion part lie on a common axis and are constructed so that the insertion part can be inserted into the seats along this axis.

3. A molding tool according to claim 2, wherein the seats comprise holes into which a rod-shaped insertion part can be pushed.

4. A molding tool according to claim 1, wherein the mold cavities are mounted rotatably on the molding tool.

5. A molding tool according to claim 1, wherein the tool is mounted so as to be rotatable and includes a plurality of the mold cavities for simultaneously producing at least two subassemblies.

6. A molding tool for producing a plurality of assembled, injection molded components, wherein a mold cavity is provided for each of the molded components, each mold cavity comprising mold parts for forming a respective mold geometry associated with a different production state of the components, wherein the mold geometry of at least one mold cavity forms a seat for an insertion part which connects the components into a subassembly, and wherein the mold parts of each mold cavity include a damper frame, and the damper frame and the mold parts together define the configuration of a molded switching damper, and wherein the seats for the insertion part are provided in one of the mold parts in such a manner that the insertion part extends through the mold cavity provided for molding the switching damper.

7. A molding tool according to claim 6, wherein the insertion part is a shaft.

* * * * *